United States Patent [19]

Honjo

[11] Patent Number: 5,627,809
[45] Date of Patent: May 6, 1997

[54] OPTICAL DISK DEVICE HAVING HIGH-SPEED REPRODUCTION CAPABILITY

[75] Inventor: Masahiro Honjo, Osaka-fu, Japan

[73] Assignee: Matsushita Electric Industrial Co., Ltd., Osaka-fu, Japan

[21] Appl. No.: 471,885

[22] Filed: Jun. 7, 1995

Related U.S. Application Data

[63] Continuation-in-part of Ser. No. 415,516, Apr. 3, 1995, which is a continuation-in-part of Ser. No. 224,200, Apr. 6, 1994, abandoned, which is a continuation of Ser. No. 939,684, Sep. 2, 1992, abandoned.

[51] Int. Cl.$^6$ ........................................ G11B 7/00
[52] U.S. Cl. ........................... 369/47; 369/50; 369/58; 369/59; 360/48; 386/80; 386/82; 386/111; 386/126
[58] Field of Search ........................... 369/47, 48, 49, 369/50, 54, 58, 59, 124, 32; 360/33.1, 48, 38.1, 39; 358/335

[56] References Cited

U.S. PATENT DOCUMENTS 5,371,602  12/1994  Tsuboi et al. ............... 360/33.1 X
5,432,613   7/1995  Lee ............................ 360/33.1 X

FOREIGN PATENT DOCUMENTS 3-221508  8/1991  Japan .

*Primary Examiner*—Muhammad N. Edun
*Attorney, Agent, or Firm*—Wenderoth, Lind & Ponack

[57] ABSTRACT

An optical disk drive for reproducing digitally compressed image data is configured such that during high-speed fast forwarding or fast reversing of an optical disk, only the field or frame compressed by the in-field or in-frame coding is reproduced. At the same time, the decoded same field or same frame is repeatedly displayed every plural number of times. Alternatively, the rotating speed of the optical disk is increased relative to that of normal reproduction to raise the transfer rate of the reproduced data, whereby the same field or same frame is displayed a reduced number of times, such as once.

4 Claims, 3 Drawing Sheets

1

OPTICAL DISK DEVICE HAVING HIGH-SPEED REPRODUCTION CAPABILITY

CROSS-REFERENCE TO RELATED APPLICATIONS

This is a continuation-in-part of copending application Ser. No. 08/415,516, filed Apr. 3, 1995, which is a continuation-in-part of abandoned application Ser. No. 08/224,200, filed Apr. 6, 1994, which was a continuation of abandoned application Ser. No. 07/939,684, filed Sep. 2, 1992.

BACKGROUND OF THE INVENTION

1. Field of the Invention

The present invention relates to an optical disk drive for reproducing digitally-compressed image data.

2. Description of the Prior Art

Proposals have been made in recent years regarding reproduction of digitally-compressed image data resulting from in-field or in-frame processing and inter-field or inter-frame processing.

In general, the quantity of data coded in a field or in a frame is several times larger than that subjected to inter-field or inter-frame coding.

Meanwhile, from the viewpoint of decoding, it is desirable to reproduce only the data processed by the in-field or in-frame coding when high-speed reproduction of data is intended, for example during fast forwarding or fast reverse reproduction of the optical disk.

The reproducing time of data of one field or one frame through coding is generally longer than the output time of decoded data of one field or one frame (one frame=1/30 sec), resulting in generation of an interval where a decoding signal is absent. In other words, is has not been possible to output decoded signals in a continuous manner.

SUMMARY OF THE INVENTION

The object of the present invention is therefore to provide an optical disk drive adapted to reproduce digital image data which has been digitally compressed by in-field or in-frame coding and inter-field or inter-frame coding, whereby only the compressed field or frame subject to in-field or in-frame coding is reproduced during high-speed reproduction of data such as in fast-forward and fast-reverse reproduction. At the same time, the decoded same field or frame is repeatedly displayed a plural number of times. Also, the rotating speed of the disk is optionally increased in comparison with that of normal reproduction, thereby further enhancing the transfer rate of the reproduced data.

According to the present invention, since the same data is repeatedly output until the succeeding data processed by the in-field or in-frame coding is reproduced, it becomes possible to prevent omission of reproduced images.

Moreover, since the transfer rate may be further improved due to an increased rotating speed of the disk, the reproducing time of data is shortened significantly. In this case, high-speed and smooth reproduction of data is realized by displaying each frame a reduced number times, such as one time.

BRIEF DESCRIPTION OF THE DRAWINGS

This and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
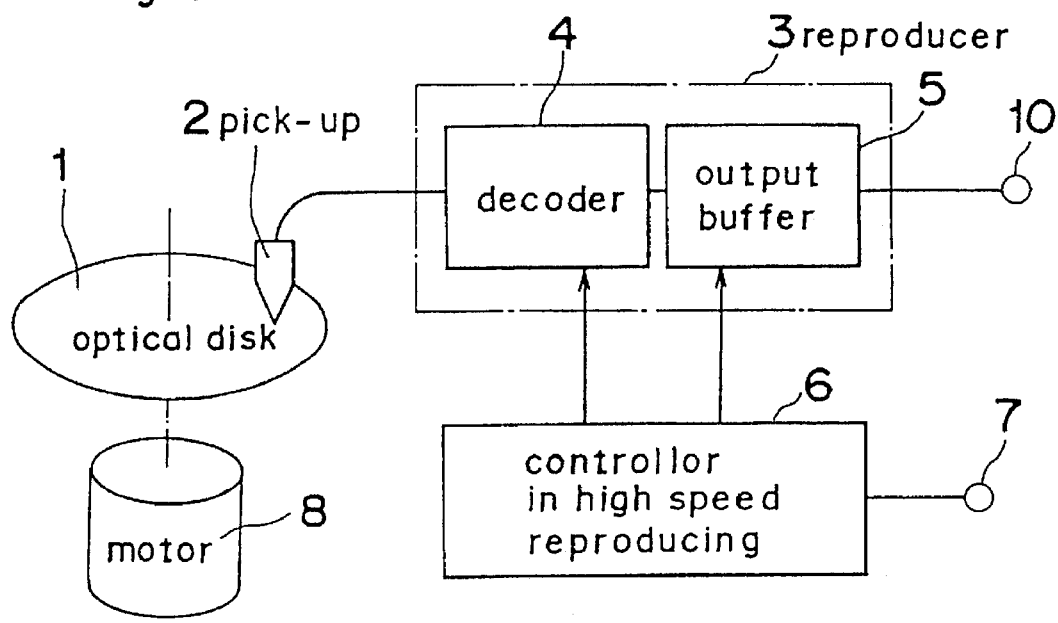
FIG. 1 is a block diagram of an optical disk drive according to a first embodiment of the present invention.

A first embodiment of the present invention will be described with reference to FIG. 1.

The data reproduced from an optical disk 1 by a pickup 2 is input to a reproducing circuit 3. The reproducing circuit 3 is constituted of a decoder circuit 4 and an output buffer circuit 5. The reproduced data is decoded into image data by the decoder circuit 4 and output to an output terminal 10 through the output buffer circuit 5.

When reproducing data at high speeds, the pick-up 2 is controlled to radially traverse the disk 1 to effect a track jumping operation. Further, a high-speed reproduction control circuit 6 controls the decoder circuit 4 to decode only the data of fields or frames compressed by the in-field or in-frame coding. At the same time, the output buffer circuit 5 is also controlled by the control circuit 6 so as to repeatedly display the same decoded field or frame a plural number of times.

An input signal for the control circuit 6 is sufficient to distinguish between normal reproduction and high-speed reproduction. For example, an input signal is obtained when a user controls a terminal 7 through a switch or the like.

In the first embodiment, the rotating speed of the disk is controlled by a motor driver 9 and is the same during both normal reproduction and high-speed reproduction. This rotating speed is, in actuality, in excess of a minimum required rotational speed needed to reproduce data from the optical disk.

Figure 2:
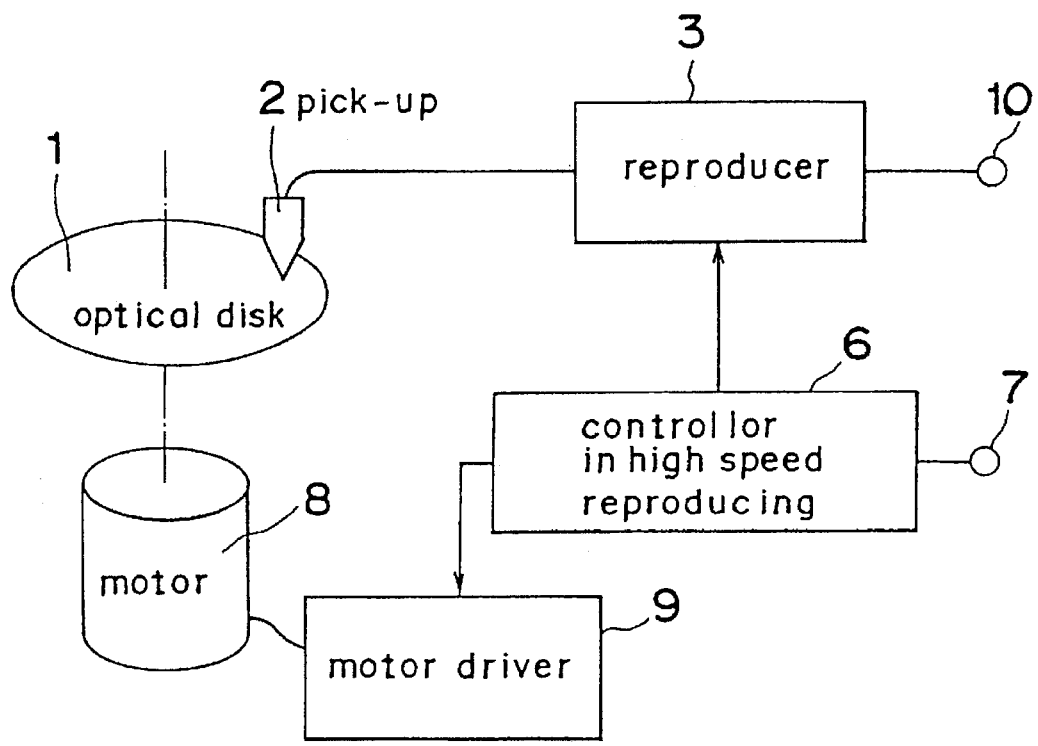
FIG. 2 is a block diagram of an optical disk drive according to a second embodiment of the present invention.

A second embodiment of the present invention will be described with reference to FIG. 2.

The data reproduced from the optical disk 1 by the pickup 2 is input to the reproducing circuits.

When the data is to be reproduced at high speeds, the reproducing circuit 3 is controlled by the high-speed reproduction control circuit 6 so that is decodes and outputs only the data of fields or frames compressed by the in-field or in-frame coding.

At the same time, a motor driving circuit 9 controls the rotation of the motor in accordance with an instruction from the control circuit 6 so as to make the rotating speed of the disk much faster than that when the data is reproduced normally, and to increase the transfer rate of the reproduced data.

It is sufficient for an input signal of the control circuit 6 to be able to distinguish whether the normal reproduction or the high-speed reproduction is required. Therefore, the input signal for the control circuit 6 can be obtained, for instance, by controlling the terminal 7 by means of a switch or the like operated by a user.

Figure 3:
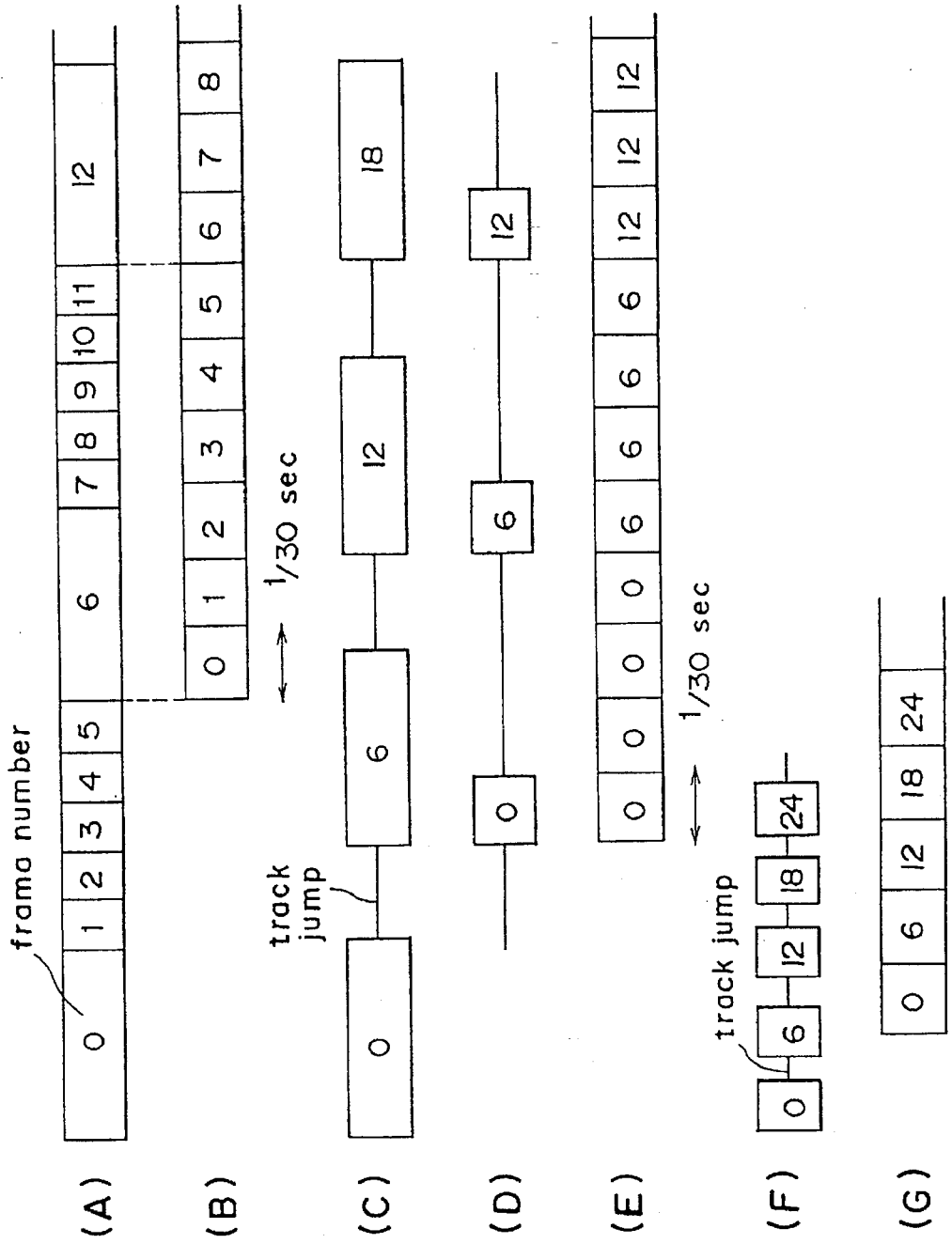
FIGS. 3(A) through 3(G) are diagrams of patterns of reproduced signals in the embodiments of the present invention.

A reproduced signal in the aforementioned first and second embodiments will be described with reference to the diagrams of FIG. 3.

FIG. 3(A) is a diagram of digital data reproduced from the optical disk, wherein 0–12 designate the number of each frame. The frames subjected to the in-frame compression are frame numbers 0, 6, 12. The other frames are processed by the inter-frame compression. As shown, the frames processed by the in-frame compression are less in number than the frames processed by the interframe compression.

During the normal reproduction, the reproduced digital data of FIG. 3(A) is decoded to thereby obtain a decoded output signal of FIG. 3(B). That is, each frame of the decoded output signal of FIG. 3(B) is a constant 1/30 sec. in duration.

The 0th frame of the output signal of FIG. 3(B) is output with a delay of several frames from the digital data of FIG. 3(A). This delay time is generated due to the decoding time of data. For example, in the case where the data of the 6th frame is necessary to decode the 1st frame, the 1st frame is operated and decoded after the data of the 6th frame is reproduced.

In such a case, the amount of the delay is actually in excess of that shown in FIG. 3(B), and the delay shown in FIG. 3(B) is merely for explanation purposes.

Now, the high-speed reproduction of data will be described. When the data is to be reproduced through fast forwarding, only the data of the frame subjected to the in-frame processing should be considered. In other words, as shown in FIG. 3(C), the track is skipped to the frame number 6 immediately after the data of the frame number 0 is reproduced, to thereby reproduce the frame number 6.

An output at this time is, e.g., as indicated in FIG. 3(D), intermittently reproduced, because the reproducing time of one frame is longer than the output time after decoding.

As such, in order to avoid the intermittent reproduction of outputs, data of the same frame is repeatedly displayed according to the first embodiment of the present invention, as is represented in FIG. 3(E). In consequence, an image can be reproduced much more favorably than in FIG. 3(D). When the same data is displayed in every four frames, the fast forwarding speed is increased 6/4=1.5 times.

If the access interval of frames is expanded, for example, to thereby make access to the 12th frame subsequent to the 0th frame, the reproducing speed can be increased, but such would result in the generation of a harsh image.

According to the second embodiment of the present invention, the rotating speed of the disk is increased when the data is to be reproduced at high speeds, thus further increasing the transfer rate.

FIG. 3(F) illustrates an example where the transfer rate is nearly quadrupled compared to the high-speed reproduction of the first embodiment, so that the reproducing time of data of the in-field coded or in-frame coded frame is reduced to ¼ that of the first embodiment. This arrangement makes it possible also to update a decoding signal for every one frame if the reproducing time including the access time is within 1/30 sec. Therefore, the data can be output, as shown in FIG. 3(G), at a speed six times as fast as in the normal reproduction.

Here, it is to be noted that the term "minimum required rotational speed needed to reproduce data in the normal reproduction" used above is generally referred to as a minimum required rotational speed (MRRS). The minimum required rotational speed takes various values for various systems according to their standards, and such minimum required rotational speeds are known in the art. For example, in the case of the laser disk system, the minimum required rotational speed is 11.4 m/sec, and in the case of the VHS VCR system, the minimum required rotational speed is 5.8 m/sec.

In the case of a variable rate coding system where the transfer rate varies every moment due to the change of the size of the data after the variable length coding, the transfer rate varies between the minimum transfer rate Rmin and the maximum transfer rate Rmax. In this case, the minimum required rotational speed is the rotational speed of the disk for obtaining the maximum transfer rate Rmax.

It is to be noted here that the phrase "variable rate coding system" mentioned above is a system in which the data amount varies for different frames, or the data amount varies for different groups of frames. For example, as shown in FIG. 3(A), the data size of the first group of frames covering frames 0–5 and that of the second group of frames covering frames 6–11 are different.

Figure 4:
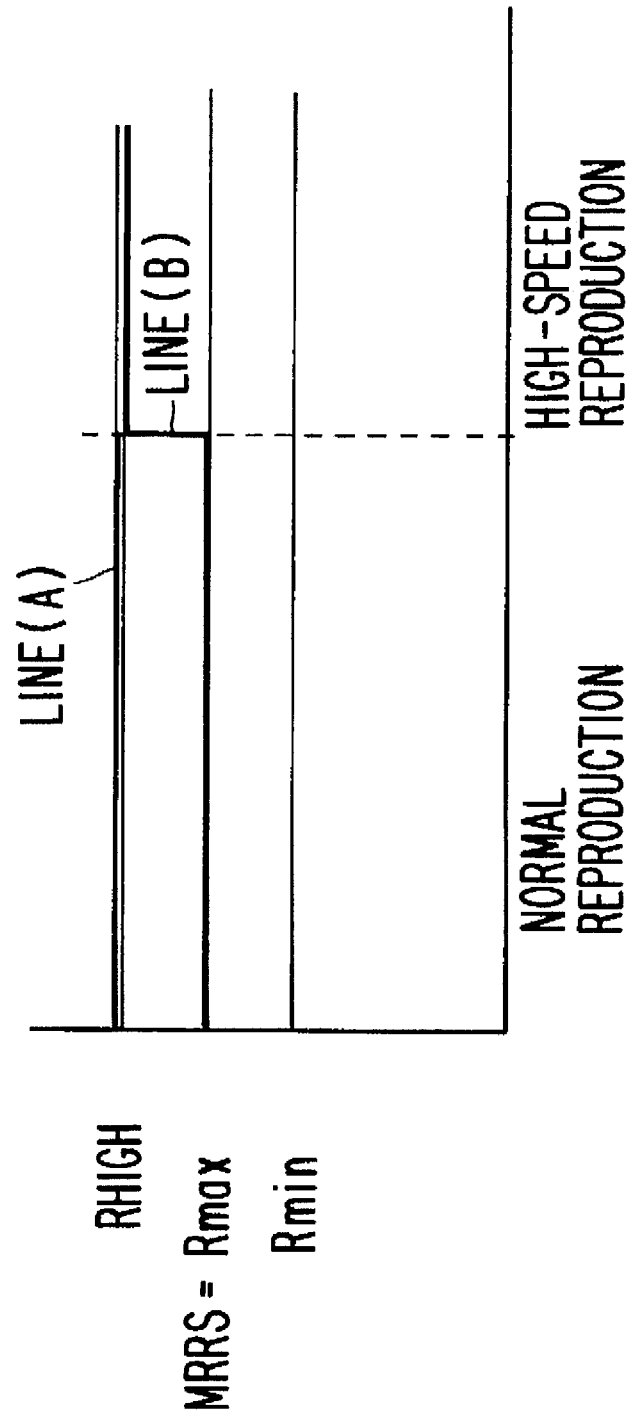
FIG. 4 shows a disk rotational speed for normal and high-speed reproduction in the first and second embodiments.

According to the first embodiment of the present invention, as shown in FIG. 4 at line (A), the rotational speed of the disk is controlled to be substantially equal to $R_{HIGH}$ which is greater than the maximum transfer rate Rmax, for both normal reproduction and high-speed reproduction.

According to the second embodiment of the present invention, as also shown in FIG. 4 at line (B), the rotational speed of the disk is controlled to be substantially equal to Rmax for normal reproduction, and to $R_{HIGH}$ for high-speed reproduction.

Needless to say the rotating speed of the disk, namely, the transfer rate may be increased any number of times, such as two times or ten times, and is not restricted to a quadruple increase. In this case, the frequency of the clock for processing the reproducing signal must be correspondingly increased so as to meet the increase of the transfer rate.

Moreover, in the second embodiment, if necessary the same frame may be displayed more than once, i.e., two or three times, when the reproduced data is accumulated while the transfer rate is increased.

Further, although the foregoing description is related to the high-speed reproduction of only the frame processed by the in-frame coding, it is possible to reproduced also part of the frame processed by the inter-frame coding by increasing the transfer rate to more than of the normal reproduction if the reproducing speed is about twice or triple that of the normal reproduction. Accordingly, the optical disk can be fast forwarded or fast reversed more smoothly.

The present invention is applicable for data subjected to in-field or inter-field coding as well.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical disk device comprising:
   a reproducing means for reproducing from an optical disk in a normal reproduction mode digital picture image data digitally compressed by an in-field or in-frame process and an inter-field or inter-frame process to obtain a plurality of both in-field coded data fields or in-frame coded data frames and inter-field coded data fields or inter-frames coded data frames, a high-speed reproduction control means for controlling the reproducing means during a high-speed fast forwarding or fast reversing reproduction mode so as to reproduce and output only the data of each field or frame compressed by the in-field or in-frame process to obtain only the in-field coded data fields or the in-frame coded data frames, and a motor driving means for controlling, during the high-speed fast forwarding or fast reversing reproduction mode, a rotation of the motor in response to a command of said high-speed reproduction control means such that a rotational speed of the optical disk is higher than a minimum required rotational speed of the optical disk, the minimum required rotational speed of the optical disk being a minimum speed needed to reproduce data from the optical disk, wherein the compressed picture image data is a variable rate data in which the data transfer rate continuously varies within a range between a minimum transfer rate and a maximum transfer rate, and wherein said minimum required rotational speed of the optical disk is a speed necessary to obtain the maximum transfer rate.

2. The optical disk device as claimed in claim 1, wherein a data transfer rate during the high-speed fast forwarding or fast reversing reproduction mode is higher than the maximum transfer rate during a normal speed reproduction mode.

3. An optical disk device comprising:

a reproducing means for reproducing from an optical disk digital picture image data digitally compressed by an in-field or in-frame process and an inter-field or inter-frame process to obtain a plurality of both in-field coded data fields or in-frame coded data frames and inter-field coded data fields or inter-frames coded data frames, the reproducing means including a picture image data decoder and an output buffer, a high-speed reproduction control means for controlling said picture image data decoder during a high-speed fast forwarding or fast reversing reproduction mode so as to decode only the in-field coded data fields or the in-frame coded data frames reproduced by said reproducing means and for controlling said output buffer so as to repeatedly display the same decoded field or frame once or a plurality of times so as to avoid an intermittent reproduction of outputs, and a motor driving means for controlling, during the high-speed fast forwarding or fast reversing reproduction mode, a rotation of the motor in response to a command of said high-speed reproduction control means such that a rotational speed of the optical disk is higher than a minimum required rotational speed of the optical disk, the minimum required rotational speed of the optical disk being a minimum speed needed to reproduce data from the optical disk, wherein the compressed picture image data is a variable rate data in which the data transfer rate continuously varies within a range between a minimum transfer rate and a maximum transfer rate, and wherein said minimum required rotational speed of the optical disk is a speed necessary to obtain the maximum transfer rate.

4. The optical disk device as claimed in claim 3, wherein a data transfer rate during the high-speed fast forwarding or fast reversing reproduction mode is higher than the maximum transfer rate during a normal speed reproduction mode.

* * * * *